B. C. SWINEHART.
VEHICLE TIRE.
APPLICATION FILED DEC. 7, 1908.

954,224.

Patented Apr. 5, 1910.

WITNESSES
Glenara Fox
Elma Blinn

INVENTOR
Benjamin C. Swinehart
by C E Humphrey
ATTORNEY,

UNITED STATES PATENT OFFICE.

BENJAMIN CLIFFORD SWINEHART, OF AKRON, OHIO.

VEHICLE-TIRE.

954,224.  Specification of Letters Patent.  Patented Apr. 5, 1910.

Application filed December 7, 1908. Serial No. 466,341.

*To all whom it may concern:*

Be it known that I, BENJAMIN CLIFFORD SWINEHART, a citizen of the United States, residing at Akron, in the county of Summit and State of Ohio, have invented new and useful Improvements in Vehicle-Tires, of which the following is a specification.

This invention relates to vehicle tires of the general type shown and illustrated in United States Letters Patent No. 771,947 granted to James A. Swinehart on October 11, 1904 and is designed to be an improvement thereon, the object being to so construct a tire that the cross wires embedded in the body of the same are held in position and forced outwardly and laterally into engaging relation with the tire-retaining means by reason of the fact that their inner ends extend across a central circumferential opening in the base of the tire body and abut against the opposite surface of said opening, whereby when said opening is contracted, due to the placing of the tire in a rim, or to the pressure of a load upon the tread of the tire, the tendency will be to force the cross-wires outwardly or laterally, causing their outer ends to engage the tire-retaining means more perfectly than if the inner ends of the wires terminated within the opening at points remote from the surface thereof.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claim hereunto appended.

Figure 1:
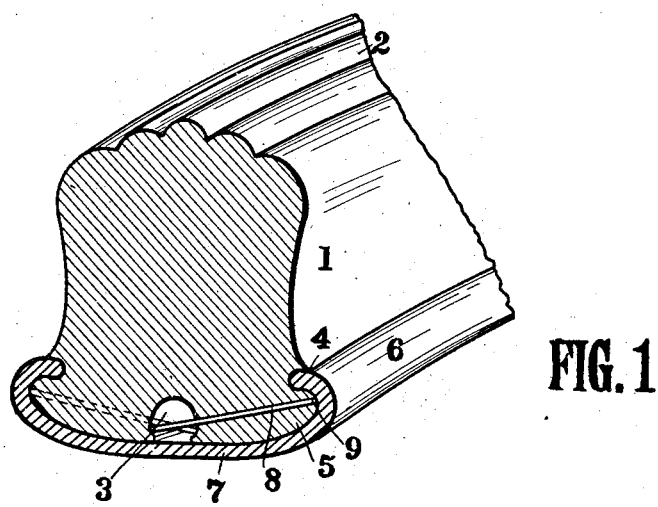

In the drawings, in which similar reference numerals indicate like parts in the different figures: Figure 1 is a cross sectional perspective view of the rim-portion of a vehicle wheel with a tire mounted thereon, embodying this invention; and, Fig. 2 is a cross sectional perspective view of a tire similarly provided previous to being mounted on a vehicle wheel rim.

Referring to the drawings in detail, the reference numeral 1 denotes a tire composed of a body of rubber of suitable resiliency preferably provided with a beaded or corrugated tread portion 2 and further having formed in the base or inner face thereof, preferably centrally beneath the tread portion, a circumferentially-extending groove or opening 3, usually cylindrical in cross-section which extends completely around the inner surface of the tire. The side portions of the tire are provided with means to coöperate with the tire-engaging portions of the rim on which the same is mounted and in the tire shown in the drawings the lateral portions are provided with circumferentially-extending grooves 4, below which are laterally-projecting beads 5. The circumferential grooves 4 are adapted to receive the in-turned clencher flanges 6 of a rim 7, customarily employed for holding this type of tire in position on a vehicle wheel. In positioning a tire of this description in a rim such as has just been described, the laterally-projecting beads 5 will project into the concave inner portions of the flanges 6 and lock thereunder.

The locking means for the tire consists of two series of cross wires or rods 8, the members of each series extending through the outer edges of the lateral beads 5 into the opening or groove 3 and each is of sufficient length to abut against the opposite wall or surface thereof. The members of each series of cross wires 8 are placed in staggered relation with the members of the opposite series, so that they will alternate in position with respect thereto, with all the inner ends of the members of both series extending into and across the opening or groove 3 from opposite sides thereof and abutting against the opposite surfaces of said opening or groove 3.

Figure 2:
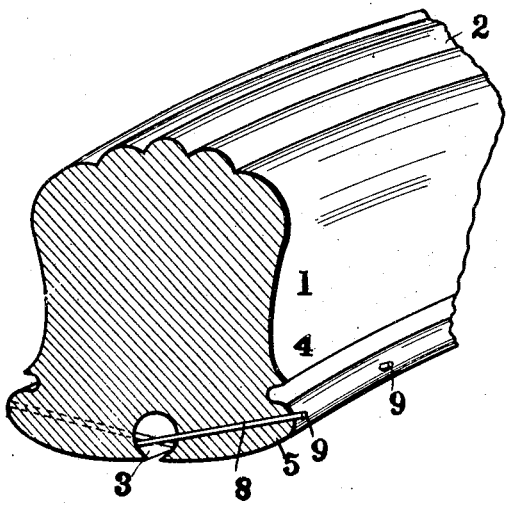

In constructing a tire of this description, the wires 8 will be inserted in the body of the tire through the beads 5 until their inner ends extend across the opening 3 and abut against the opposite surface thereof and they will be of such a length, when first positioned, that their outer ends 9 will project a slight distance beyond the normal outlines of the beads 5, as clearly shown in Fig. 2.

When a tire such as is shown in Fig. 2 is mounted in a wheel rim in the manner illustrated in Fig. 1, the outer or projecting ends 9 of the wires 8 will be forced inwardly until they are approximately flush with the surfaces of the beads 5, thereby enlarging or distorting the shape of the opening 3, as shown in Fig. 1 and also placing on the material in the base of the tire, adjacent the opening, an increased degree of tension or compression, so that the tendency of the material of which the tire is composed in its effort to resume its normal condition, due to its inherent elasticity, will constantly tend to force the cross wires outwardly against the concave surfaces of the flanges 6, thereby keeping the wires fixedly in position in the body of the tire with their outer ends in the beads 5 to engage under the inturned clencher flanges 6. It will be apparent that pressure placed upon the tread of a tire, such as that caused by a load on the vehicle when in use, will tend to contract the opening 3, causing thereby an increased pressure on the inner ends of the wires 8, thus forcing them into snug engagement with the tire-retaining flanges 6.

The peculiar object and function attained by extending the wires to the opposite walls or surfaces of the opening or groove 3 is to secure an elastic abutment for the inner ends of the cross wires, which abutment will tend to force the wires outwardly or laterally when the tire is compressed for any purpose, such as when placed within a vehicle rim or under the influence of a strain or load imposed upon the tire. This peculiar object could not be attained if the inner ends of the cross wires 8 terminated within the opening at points remote from the edges thereof; nor could this object be attained if the ends of the wires were embedded or submerged in the material of the tire itself, for the reason that in the former case where the cross wires are terminated within the opening, their inner ends would be unsupported and the entire wires would be permitted a longitudinal movement which would prevent their being forced outwardly by the pressure of the material. If the inner ends of the wires were embedded or submerged in the material of the tire the slight movement of the same, due to the movement of the tire under a load, would cause the ends of the tire to cut through the material of the body portion much more rapidly than if the ends were placed in abutting relation with the surface of the opening.

It will be noted that when the cross wires 8 are placed in position their inner ends are in abutting relation with the surface of the opening 3, as has been described, and their inner ends extend laterally beyond the sides of the tire so that when the tire is positioned in a rim and the outer ends of the cross wires forced inwardly flush with the outside surface of the tire, the material on both sides of the opening is compressed, thereby adding greater rigidity and firmness to the base portion of the tire and making the same more efficient in use and less liable to be torn from its seat in the rim.

What I claim and desire to secure by Letters Patent, is:—

A vehicle tire comprising the combination with a rim having the sides thereof inturned to provide clenchers, and a body of elastic material mounted in the rim and formed with a tread and a base having a circumferentially extending groove in its inner face to separate the base into two sections, a series of combined spreading and holding wires embedded in and extending transversely of each of the sections of the base, said wires of such a length as to extend from the wall of the groove to beyond the lateral face of the base at the opposite side when the body is detached from the rim, the wires of one series oppositely disposed with respect to the wires of the other series whereby when said body is mounted in the rim, the wires will laterally spread the sections to wedge within and frictionally engage the clenchers of the rim, and the wires permanently bear against the inner faces of the clenchers to prevent creeping of said body.

In testimony whereof I have hereunto set my hand in presence of two subscribing witnesses.

BENJAMIN CLIFFORD SWINEHART.

Witnesses:
C. E. HUMPHREY,
GLENARA FOX.